(12) United States Patent
Perkins et al.

(10) Patent No.: US 12,063,303 B2
(45) Date of Patent: Aug. 13, 2024

(54) COMPUTER SYSTEMS AND COMPUTER-IMPLEMENTED METHODS UTILIZING BLOCKCHAIN AGNOSTIC CONNECTION TOOLS FOR BLOCKCHAIN-BASED DATA STRUCTURES

(71) Applicant: BYT, INC., Miami, FL (US)

(72) Inventors: Williams Perkins, Miami, FL (US); Kaleb Phillips, Miami, FL (US); Tanner Larsson, Miami, FL (US); Suraj Pai, Miami, FL (US)

(73) Assignee: BYT, INC., Miami, FL (US)

( * ) Notice: Subject to any disclaimer, the term of this patent is extended or adjusted under 35 U.S.C. 154(b) by 0 days.

(21) Appl. No.: 18/478,743

(22) Filed: Sep. 29, 2023

(65) Prior Publication Data
US 2024/0113884 A1    Apr. 4, 2024

Related U.S. Application Data

(60) Provisional application No. 63/377,673, filed on Sep. 29, 2022.

(51) Int. Cl.
*H04L 29/06*    (2006.01)
*H04L 9/00*    (2022.01)
*H04L 9/32*    (2006.01)

(52) U.S. Cl.
CPC .............. *H04L 9/3213* (2013.01); *H04L 9/50* (2022.05)

(58) Field of Classification Search
CPC ................................. H04L 9/3213; H04L 9/50
See application file for complete search history.

(56) References Cited

U.S. PATENT DOCUMENTS

| | | | | |
|---|---|---|---|---|
| 10,868,674 | B2* | 12/2020 | Beecham | H04L 9/0637 |
| 10,880,074 | B2* | 12/2020 | Revankar | G06Q 20/02 |
| 11,501,297 | B1* | 11/2022 | Tai | G06Q 20/02 |
| 2008/0086759 | A1* | 4/2008 | Colson | H04L 63/1416 713/182 |

(Continued)

OTHER PUBLICATIONS

International Search Report and Written Opinion to corresponding International Application No. PCT/US23/75627, mailed Jan. 12, 2024.

*Primary Examiner* — Shawnchoy Rahman
(74) *Attorney, Agent, or Firm* — Greenberg Traurig, LLP (57) ABSTRACT

Systems and methods enable a marketplace system to display, in an interface accessible to a user, first digital tokens maintained in a first token-holding data structure of a first token-holding data structure provider of a blockchain network. A selection of a second token-holding data structure provider and a selection of a second token-holding data structure associated with the second token-holding data structure provider may be received from the user. An authentication message may be received, the authentication message including encrypted information which may be decrypted to extract information for authentication of the user as owner of the second token-holding data structure. Upon authentication, a link to the second token-holding data structure may be established, and information about second digital tokens maintained in the second token-holding data structure may be received via the link to display the first digital tokens and the second digital tokens in the interface.

20 Claims, 4 Drawing Sheets

(56) References Cited

U.S. PATENT DOCUMENTS

| | | | |
|---|---|---|---|
| 2013/0191227 A1* | 7/2013 | Pasa | G06Q 20/027 |
| | | | 705/41 |
| 2015/0127529 A1* | 5/2015 | Makhotin | G06Q 20/322 |
| | | | 705/39 |
| 2016/0180332 A1 | 6/2016 | Wilczynski | |
| 2016/0323290 A1 | 11/2016 | Stead et al. | |
| 2019/0034920 A1* | 1/2019 | Nolan | H04L 9/50 |
| 2019/0163896 A1 | 5/2019 | Balaraman et al. | |
| 2019/0272534 A1 | 9/2019 | Griffith | |
| 2019/0294817 A1* | 9/2019 | Hennebert | H04L 9/0861 |
| 2020/0372494 A1* | 11/2020 | Ramanathan | G06Q 20/3829 |
| 2021/0004792 A1 | 1/2021 | Kikinis et al. | |
| 2022/0019989 A1* | 1/2022 | Ready | G06Q 30/0641 |
| 2023/0004423 A1* | 1/2023 | Fatahi | G06F 21/64 |
| 2023/0108610 A1* | 4/2023 | Tang | G06Q 20/3672 |
| | | | 705/66 |
| 2023/0360031 A1* | 11/2023 | DeLuca | G06Q 20/3821 |

* cited by examiner

COMPUTER SYSTEMS AND COMPUTER-IMPLEMENTED METHODS UTILIZING BLOCKCHAIN AGNOSTIC CONNECTION TOOLS FOR BLOCKCHAIN-BASED DATA STRUCTURES

CROSS REFERENCE TO RELATED APPLICATIONS

This application is a continuation of and claims priority from U.S. Provisional Application No. 63/377,673, filed Sep. 29, 2022, entitled: COMPUTER SYSTEMS AND COMPUTER-IMPLEMENTED METHODS UTILIZING BLOCKCHAIN AGNOSTIC CONNECTION TOOLS FOR BLOCKCHAIN-BASED DATA STRUCTURES, which is hereby incorporated by reference.

FIELD OF THE DISCLOSURE

Generally, the present disclosure is directed to computer-implemented methods and computer systems configured for a blockchain agnostic connection tool for one or more blockchain-based data structures (e.g., electronic/digital wallets holding NFTs).

BACKGROUND

Managing multiple separate blockchain wallets can be technologically difficult. For example, if a user is logged into wallet A, for them to interact with or see the contents of wallet B, they would need to log out of wallet A and login to the additional wallet.

SUMMARY

In some aspects, the techniques described herein relate to a method including: displaying, by at least one processor, in an interface accessible to a user via a login, one or more first digital tokens maintained in a first token-holding data structure of a first token-holding data structure provider of a first blockchain network; receiving, by the at least one processor, from the user, a selection of a second token-holding data structure provider of a plurality of token-holding data structure providers; receiving, by the at least one processor, from the user, a selection of a second token-holding data structure associated with the second token-holding data structure provider; receiving, by the processor, from the user, at least one authentication message for authenticating the user as owner of the second token-holding data structure, the at least one authentication message including encrypted information; decrypting, by the processor, the encrypted information of the at least one authentication message to extract information for authentication of the user; establishing, by the at least one processor, a link to the second token-holding data structure a verification of the user as owner of the second token-holding data structure based at least in part on the information matching at least one attribute of the second token-holding data structure; receiving, by the at least one processor, via the link, information about one or more second digital tokens maintained in the second token-holding data structure; and displaying, by the at least one processor, in the interface, the one or more first digital tokens maintained in the first token-holding data structure and the one or more second digital tokens maintained in the second token-holding data structure.

In some aspects, the techniques described herein relate to a method, further including: receiving, by the at least one processor, from the user, a subsequent login attempt to access the interface; validating, by the at least one processor, the subsequent login attempt to enable the user to access the interface; and accessing, by the at least one processor, a first current state of the one or more digital tokens maintained in the first token-holding data structure and, via the link, a second current state of the one or more second digital tokens maintained in the second token-holding data structure; and displaying, by the processor, in the interface, the first current state of the one or more digital tokens maintained in the first token-holding data structure and the second current state of the one or more second digital tokens maintained in the second token-holding data structure.

In some aspects, the techniques described herein relate to a method, wherein the second token-holding data structure is associated with a second blockchain network that is different from the first blockchain network.

In some aspects, the techniques described herein relate to a method, wherein the second token-holding data structure is associated with the first blockchain network.

In some aspects, the techniques described herein relate to a method, wherein the first token-holding data structure provider and the second token-holding data structure provider are different token-holding structure providers of the plurality of token-holding data structure providers.

In some aspects, the techniques described herein relate to a method, wherein the information includes an address of the second token-holding data structure.

In some aspects, the techniques described herein relate to a method, further including: requesting, by the processor, from the second token-holding data structure provider, authentication information for access to the second token-holding data structure; receiving, by the processor, from the second token-holding data structure provider, the authentication information including the at least one attribute of the second token-holding data structure; authenticating, by the processor, the user as the owner of the second token-holding data structure based on the authentication information matching the information for authentication of the user; and establishing, by the processor, a link to the second token-holding data structure based on the authenticating.

In some aspects, the techniques described herein relate to a method, wherein the link includes a persistent authentication with the second token-holding data structure to enable access to the second token-holding data structure without another authentication message.

In some aspects, the techniques described herein relate to a method, wherein the first token-holding data structure includes a first blockchain wallet.

In some aspects, the techniques described herein relate to a method, further including: generating, by the processor, at least one interface element of the interface representing an aggregate of the one or more first digital tokens and the one or more second digital tokens.

In some aspects, the techniques described herein relate to a system including: at least one processor that, upon execution of software instructions, is configured to: display in an interface accessible to a user via a login, one or more first digital tokens maintained in a first token-holding data structure of a first token-holding data structure provider of a first blockchain network; receive from the user, a selection of a second token-holding data structure provider of a plurality of token-holding data structure providers; receive from the user, a selection of a second token-holding data structure associated with the second token-holding data structure provider; receive from the user, at least one authentication message for authenticating the user as owner of the second token-holding data structure, the at least one authentication message including encrypted information; decrypt the encrypted information of the at least one authentication message to extract information for authentication of the user; establish a link to the second token-holding data structure a verification of the user as owner of the second token-holding data structure based at least in part on the information matching at least one attribute of the second token-holding data structure; receive via the link, information about one or more second digital tokens maintained in the second token-holding data structure; and display in the interface, the one or more first digital tokens maintained in the first token-holding data structure and the one or more second digital tokens maintained in the second token-holding data structure.

In some aspects, the techniques described herein relate to a system, wherein the processor is further configured to: receive, from the user, a subsequent login attempt to access the interface; validate the subsequent login attempt to enable the user to access the interface; and access a first current state of the one or more digital tokens maintained in the first token-holding data structure and, via the link, a second current state of the one or more second digital tokens maintained in the second token-holding data structure; and display, in the interface, the first current state of the one or more digital tokens maintained in the first token-holding data structure and the second current state of the one or more second digital tokens maintained in the second token-holding data structure.

In some aspects, the techniques described herein relate to a system, wherein the second token-holding data structure is associated with a second blockchain network that is different from the first blockchain network.

In some aspects, the techniques described herein relate to a system, wherein the second token-holding data structure is associated with the first blockchain network.

In some aspects, the techniques described herein relate to a system, wherein the first token-holding data structure provider and the second token-holding data structure provider are different token-holding structure providers of the plurality of token-holding data structure providers.

In some aspects, the techniques described herein relate to a system, wherein the information includes an address of the second token-holding data structure.

In some aspects, the techniques described herein relate to a system, wherein the processor is further configured to: request, from the second token-holding data structure provider, authentication information for access to the second token-holding data structure; receive, from the second token-holding data structure provider, the authentication information including the at least one attribute of the second token-holding data structure; authenticate the user as the owner of the second token-holding data structure based on the authentication information matching the information for authentication of the user; and establish a link to the second token-holding data structure based on the authenticating.

In some aspects, the techniques described herein relate to a system, wherein the link includes a persistent authentication with the second token-holding data structure to enable access to the second token-holding data structure without another authentication message.

In some aspects, the techniques described herein relate to a system, wherein the first token-holding data structure includes a first blockchain wallet.

In some aspects, the techniques described herein relate to a system, wherein the processor is further configured to: generate at least one interface element of the interface representing an aggregate of the one or more first digital tokens and the one or more second digital tokens.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. The figures are not drawn to scale and may be simplified representations for the sake of clarity. It is contemplated that elements and features of one embodiment may be beneficially incorporated in other embodiments without further recitation.

DETAILED DESCRIPTION

Among those benefits and technical solutions that have been disclosed, other objects and advantages of this disclosure can become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although they may. Thus, as described below, various embodiments of the disclosure may be readily combined, without departing from the scope or spirit of the disclosure. Further, when a particular feature, structure, or characteristic is described in connection with an implementation, it is submitted within the knowledge of one skilled in the art to effect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action is occurring. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

Figure 1:
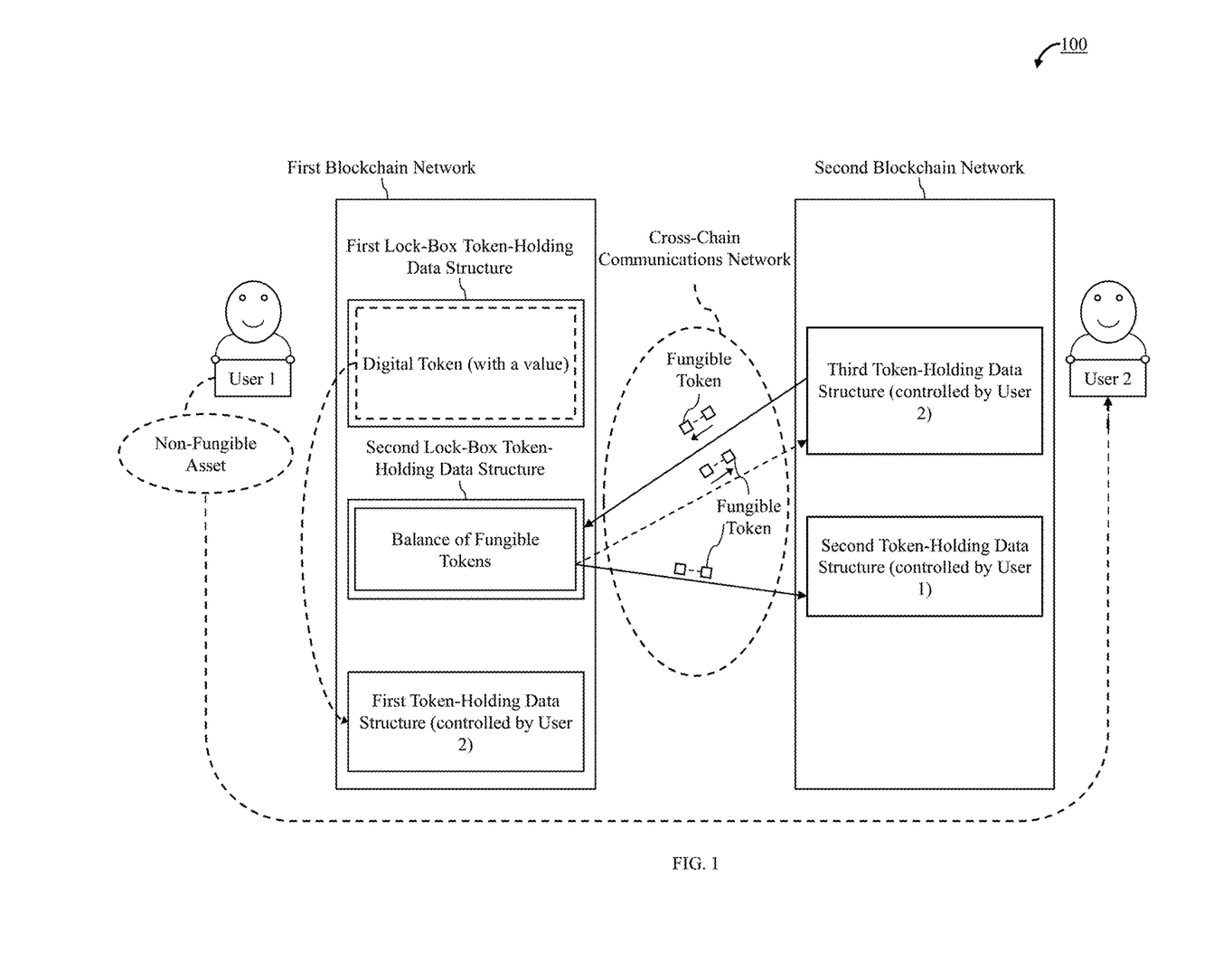
FIGS. 1-4 are representative of some exemplary aspects of the present disclosure in accordance with at least some principles of at least some embodiments of the present disclosure.

Now referring to FIG. 1, a blockchain system 100 can be a system of recording information in a way that makes it difficult or impossible to change, hack, or cheat the system, by utilizing immutable data records. The blockchain can be a digital ledger of transactions that can be duplicated and distributed across the entire network of computer systems on the blockchain. In some embodiments, the blockchain is a public blockchain in which any client device is allowed to join and participate in the blockchain network. In some embodiments the blockchain is a private blockchain in which only selected and verified client devices are allowed to join and participate in the blockchain network. An administrator of the private blockchain has the right to override, edit, or delete entries on the blockchain. In some embodiments the blockchain is a permissioned blockchain that has functionality of both private and public blockchains. An administrator of the private blockchain has the right to allocate different permissions to different client devices on the network.

In some embodiments, the exemplary inventive computer-based systems/platforms, the exemplary inventive computer-based devices, and/or the exemplary inventive computer-based components of the present disclosure may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

The blockchain system can include digital tokens, which can be non-fungible token (NFT) that are unique digital assets that can be secured and contained on a blockchain. NFTs may include one or more data schemas forming unique cryptographic tokens that exist on a blockchain and cannot be replicated. NFTs may represent digital and/or physical assets that have been tokenized via a blockchain, assigned unique identification codes and metadata that distinguish the assets from other tokens. NFTs can represent digital or real-world items like artwork and real estate. "Tokenizing" real-world tangible assets makes buying, selling, and trading them more efficient while reducing the probability of fraud. In some embodiments, NFTs may be built following the ERC-721 (Ethereum Request for Comment #721) standard, which dictates how ownership is transferred, methods for confirming transactions, and how applications handle safe transfers. NFTs can be easily created. NFTs can contain references to digital files such as photos, videos, and audio. Because NFTs are uniquely identifiable assets, they differ from cryptocurrencies, which are fungible. For example, the NFT can be a record on a blockchain that is associated with a particular digital or physical asset. For example, traditional works of art such as paintings can be valuable because they are one of a kind. However, digital files can be easily and endlessly duplicated. With NFTs, artwork can be "tokenized" to create a digital certificate of ownership that can be bought and sold.

Minting can be a process to create NFTs. On some blockchain networks, a command can be run to create the NFT as an immutable record, providing it with a unique hash that contains all of the metadata. The metadata can store key contextual information about the NFT, like its current ownership and transaction history. Marketplaces can allow users to view their NFT collection and NFTs in other collections. Each blockchain can include its own set of tools to view transaction data and minting information.

The blockchain system 100 can verify ownership, provenance, and transaction history of tokens such as cryptocurrency tokens and/or NFTs. For example, the ownership of an NFT is recorded in the blockchain, and can be transferred by the owner to another, allowing NFTs to be sold and traded. For example, as shown in FIG. 1, User 1 can sell an NFT to User 2, and the transaction can be recorded in the blockchain.

The blockchain system 100 can include one or more token-holding data structures. For example, a token-holding data structure can be a crypto wallet where a user can view cryptocurrency assets and transactions. The wallets can have different features. For example, the wallet can display NFTs on a smartphone or a desktop computer. The wallet can be protected with a 12-24 word 'seed phrase' that acts as the password to the wallet. A token-holding data structure, such as a wallet or crypto-wallet, enables users to manage, store, and trade their cryptocurrencies, NFTs and other blockchain-based tokens. It is a software that stores the record of transactions and also public and private keys which are used to perform transactions. The token-holding data structure can be accessed from web devices, including mobile ones, and the privacy and identity of the user are maintained. Transactions are secure, as they are cryptographically signed. Users can send a request to another party for a specific amount of bitcoin or other crypto-assets, and the system generates a unique address that can be sent to a third party or converted into a Quick Response code or QR code. A unique address is generated each time the user makes a request.

The blockchain system 100 can include one or more lock-box token-holding data structures. For example, lock-box token-holding data structure may be a digital wallet that was setup with digital protocol restricting the use and/or distribution of tokens based on one or more rules. In another example, the lock-box token-holding data structure is an escrow wallet. A user can use the escrow wallet to confirm any transactions of the digital tokens.

In some embodiments, a lock-box token-holding data structure can include a smart contract. The smart contract can be a self-executing contract with encoded terms of the agreement between the users and stored on the blockchain network. The code can be executed to control and cause transaction of tokens between the users.

However, managing multiple separate blockchain wallets can be technologically difficult. Currently, users have to log into multiple separate blockchain wallets to see and interact with the NFTs contained in those specific wallets. This creates a technological problem of users being have incomplete information at any given time because they cannot see all their NFTs.

For example, if a user is logged into a wallet from blockchain service provider A, for them to interact with or see the contents of their wallet from blockchain service provider B, they would need to log out of the blockchain service provider A and login to the wallet of blockchain service provider B. Constantly having to login to different blockchain service providers can waste computing resources while presenting a security risk (e.g., risk of password being intercepted) during the repetitive authentications. A frustrated user might resort to using one blockchain service provider, but that can be a security risk in case that blockchain service provider experiences downtime or is hacked, then user risks losing access to all their NFTs.

The limitation to using one wallet can create a technical problem of accessing blockchain service providers. For example, if a user is logged into wallet A of blockchain service provider A, for them to interact with or see the contents of wallet B of the same blockchain service provider A, they would need to log out of wallet A and login to wallet B. A frustrated user might resort to using one wallet, but that causes an even greater security risk if that single wallet or the service provider are hacked and the user loses all their NFTs.

Figure 2:
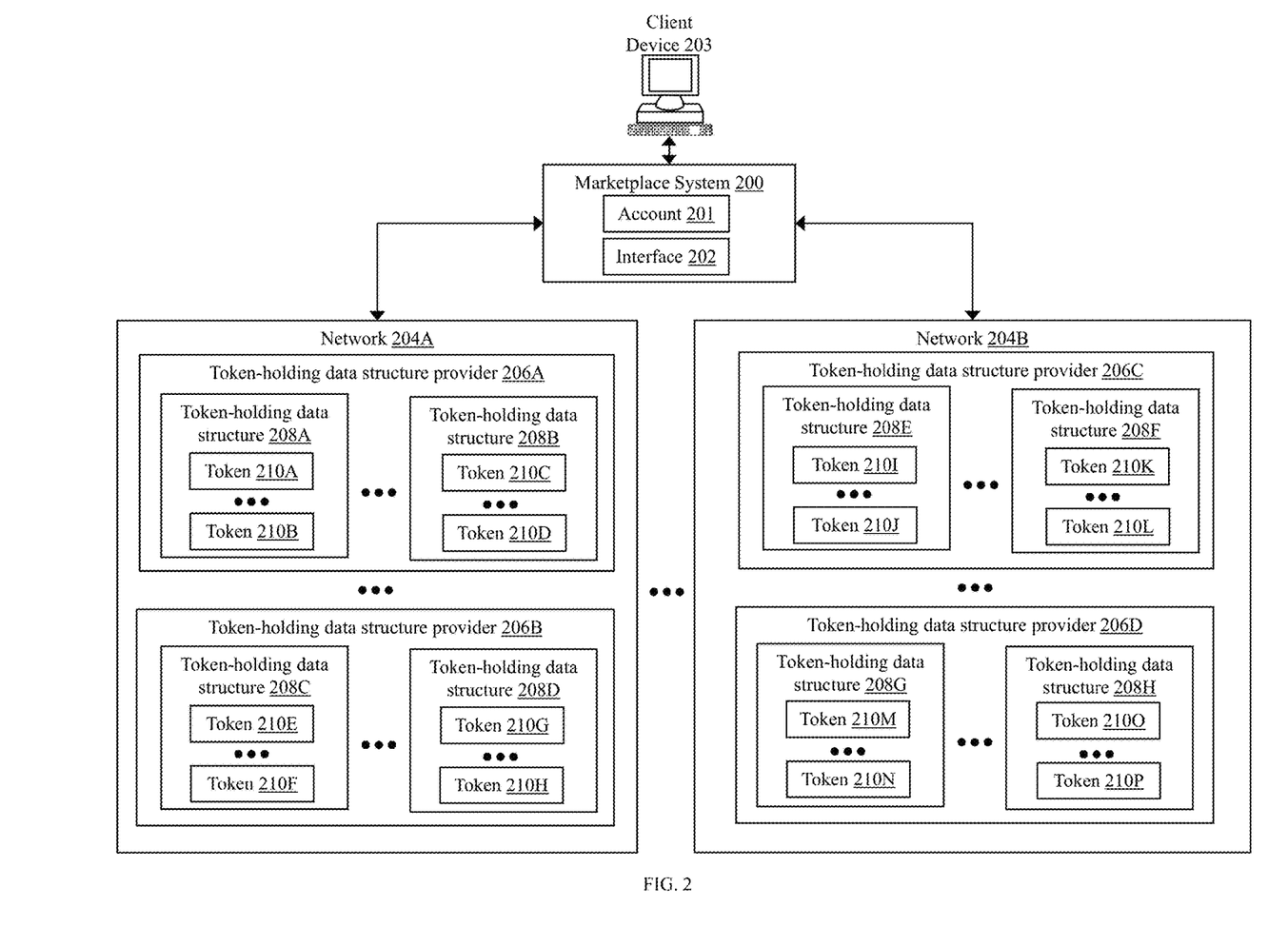

Now referring to FIG. 2, to provide technical solutions to these and other technological problems, the present disclosure includes a marketplace system 200 and methods for use thereof. In some embodiments, the marketplace system 200 can create an account 201 and display the interface 202 for the client device 203 to connect to one or more networks 204A-204B. In some embodiments, the account 201 may integrate with one or more token-holding data structure providers 206A-206D to provide a central point of access to a user's token-holding data structures 208A-208H. Thus, the account 201 on the marketplace system 200 may enable users to employ single sign-on to multiple token-holding data structures 208A-208H across one or more different token-holding data structure providers 206A-206D and one or more different networks 204A-204B with access to the contents of each of the token-holding data structures 208A-208H from single interface. For example, the one or more networks 204A-204B can be blockchain networks. The one or more networks 204A-204B can include one or more token-holding data structure providers 206A-206D. For example, the one or more token-holding data structure providers 206A-206D can be wallet providers. The one or more token-holding data structure providers 206A-206D can maintain one or more token-holding data structures 208A-208H. For example, the one or more token-holding data structures 208A-208H can be wallets for storing cryptocurrency assets and transactions. The one or more token-holding data structures 208A-208H can maintain, according to one or more data schemas, one or more digital tokens 210A-210P. For example, the one or more digital tokens 210A-210P can be NFTs.

The marketplace system 200 allows a single digital entity to be related to the one or more token-holding data structures 208A-208H across any number of unique networks 204A-204B and verify those token-holding data structures 208A-208H to relate all or any sub-combination of digital token 210A-210P contained thereof. The marketplace system 200 can advantageously establish blockchain agnostic NFT wallet connections to create the account 201 for a user of the client device 203, connect their wallets from the one or more token-holding data structure providers 206A-206D, and display all their digital tokens 210A-210P in the interface 202 to the client device 203 accessing the account 201. In some embodiments, the blockchain agnostic NFT wallet connections may be configured to enable visibility of the contents of each token-holding data structure 208A-208H, deposit of acquired tokens into one or more of the token-holding data structures 208A-208H, withdrawal of tokens from one or more of the token-holding data structures 208A-208H for sending the tokens to another, or otherwise access, modify and/or manipulate the token-holding data structures 208A-208H.

From the synergistic combination of these technologies and platforms, the marketplace system 200 can overcome numerous technical challenges and includes numerous technical solutions.

One technical solution provided by the marketplace system 200 is that users of the client device 203 can utilize verification features for verifying the relationship (e.g., ownership) between the client device 203 and the one or more token-holding data structures 208A-208H as well as use aggregation tools to verify the relationship of the digital tokens 210A-210P (e.g., NFTs) maintained in the one or more token-holding data structures 208A-208H for the user of the client device 203 (e.g., verify ownership by single entity), e.g., according to the one or more data schemas.

Another technical solution provided by the marketplace system 200 is efficiently enabling the client device 203 to manage the one or more token-holding data structures 208A-208H from the interface 202 (e.g., one singular source), which reduces the utilization of computing resources to access and manage all the one or more digital tokens 210A-210P, e.g., according to the one or more data schemas.

Another technical solution provided by the marketplace system is avoiding having to utilize computing resources for multi-signature hashing across the one or more token-holding data structures 208A-208H without an external database storing user login credentials that are independent of the individual one or more token-holding data structures 208A-208H.

Another technical solution provided by the marketplace system 200 is avoiding having to use computing resources to manage a blockchain dedicated to verifying transactions, tokens, and other holdings on the blockchain.

Another technical solution provided by the marketplace system 200 is the account 201 that maintains the security of each of the one or more token-holding data structures 208A-208H (e.g., wallets) by not attempting to aggregate the one or more token-holding data structures 208A-208H (e.g., wallets) based on a single password.

Another technical solution provided by the marketplace system 200 is the interface 202 for viewing the one or more digital tokens 210A-210P instead of just a listing of URLs.

To achieve these and other technical solutions, the marketplace system 200 can facilitate a fast, reliable and end-user focused marketplace for the one or more digital tokens 210A-210P. The marketplace system 200 can include a search function to locate the one or more digital tokens 210A-210P. The search function can enable selection of a specific one of the one or more digital tokens 210A-210P and add the specific one of the one or more digital tokens 210A-210P to the one or more token-holding data structures 208A-208H. The marketplace system 200 can include a selling platform to list the one or more digital tokens 210A-210P for sale at a specific price. The marketplace system 200 can include a social platform to enable users of the marketplace to interact via liking, commenting, emoting, and messaging.

The marketplace system 200 can be a secondary market that allows users to directly purchase NFTs with various cryptocurrencies, such as Solana (SOL). For minting, the marketplace system 200 can enable a user of the client device 203 to mint directly off of the respective collection's mint page, which can be known as the primary market.

The marketplace system 200 can enable a user of the client device 203 to sell one or more digital tokens 210A-210P. The marketplace system 200 can enable the seller can connect their one or more token-holding data structures 208A-208H to the marketplace system 200. For example, the marketplace system 200 can display a "Connect Wallet" button in an interface and responsive to detecting selection of the button, display steps to connect their wallet. For example, after connecting the one or more token-holding data structures 208A-208H, the marketplace system 200 can display the unique address and the balance of the one or more token-holding data structures 208A-208H. The marketplace system 200 can display a selectable button, such as "My Items," to enable a user of the client device 203 to view the one or more digital tokens 210A-210P of the one or more token-holding data structures 208A-208H. In response to receiving a selection of the button, the marketplace system 200 can display the one or more digital tokens 210A-210P of the one or more token-holding data structures 208A-208H. Responsive to receiving a selection to sell the one or more digital tokens 210A-210P, the marketplace system 200 can request a price. After receiving the price, the marketplace system 200 can list the one or more digital tokens 210A-210P for sale.

The networks 204A-204B can depend on processing power provided by a decentralized network of computers. Minting fees, often called "gas fees," are what the members of the networks 204A-204B can earn in return for the processing power they provide. Minting fees can fluctuate according to the amount of traffic on the networks 204A-204B at any given moment but cannot be avoided. For example, to limit wide fluctuations and avoid high fees, a flat-fee can be automatically added to each purchase of the one or more digital tokens 210A-210P.

The marketplace system 200 can integrate with various crypto exchanges. Various crypto exchanges can provide different quality of service, such as transaction costs, ease-of-registration, safety, payment options, and many other factors. For example, the marketplace system 200 can integrate with various crypto exchanges to transfer SOL to an NFT Wallet.

Figure 3:
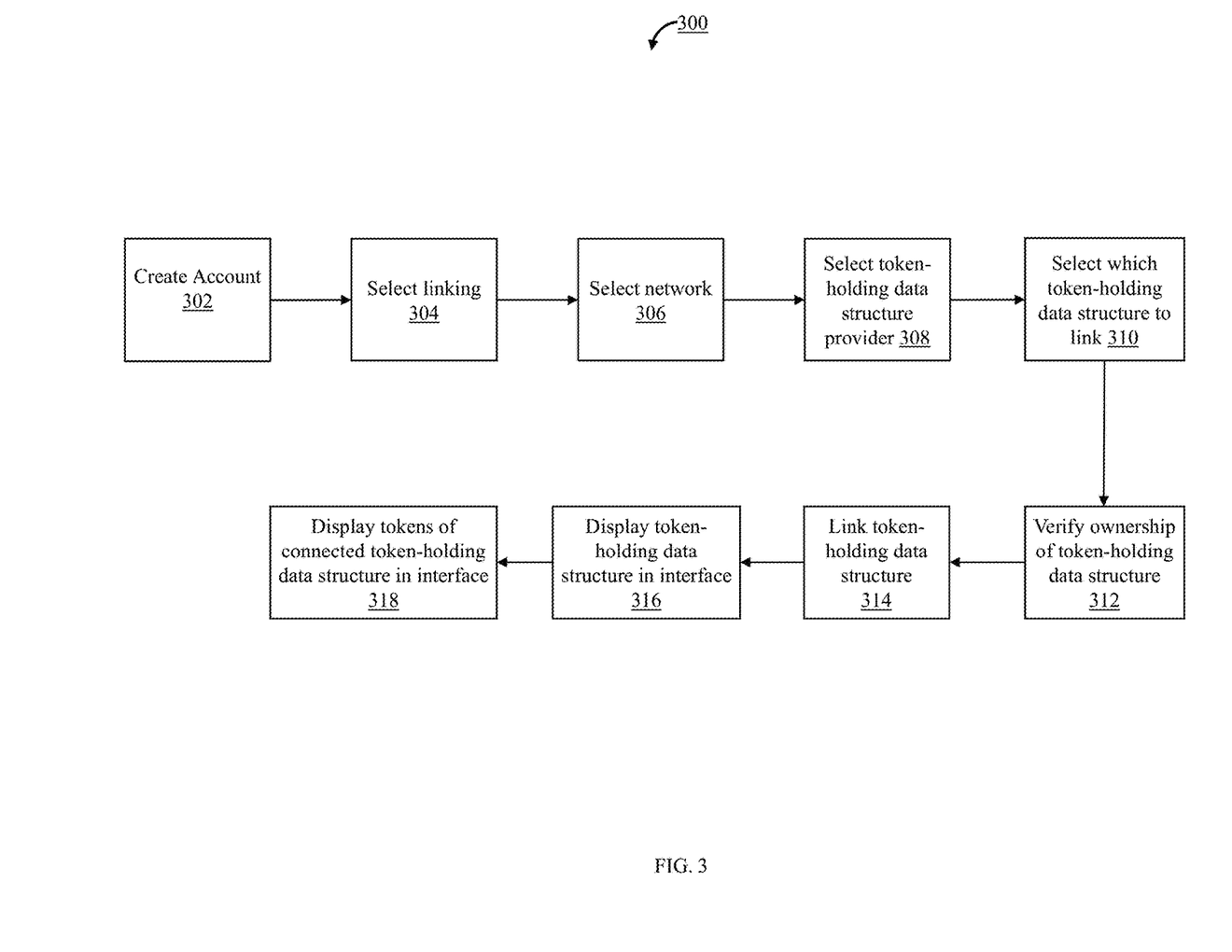

Now referring to FIG. 3, shown is a method 300 for establishing blockchain agnostic connections to one or more blockchain-based data structures. For example, the method 300 can facilitate blockchain agnostic NFT wallet connections to allow users to create an account and connect wallets from multiple blockchain service providers. In STEP 302, the user can create the account 201. In some embodiments, the marketplace system 200 can display an interface 202 with a selectable option to create the account 201, which can include a login. In some embodiments, the marketplace system 200 can identify a selection of the selectable option to create the account for the user of the client device 203. In response to identify the selection, the marketplace system 200 can generate the account 201. In some embodiments, the marketplace system 200 can generate the account 201 with a username and password.

In STEP 304, the user can select to link the one or more token-holding data structures 208A-208H. In some embodiments, the marketplace system 200 can display an interface 202 with a selectable option to link one or more token-holding data structures 208A-208H of the user. In some embodiments, the marketplace system 200 can identify a selection of the selectable option to link the one or more token-holding data structures 208A-208H of the user of the client device 203. In response to identifying the selection, the marketplace system 200 can display a list of networks 204A-204B associated with the one or more token-holding data structure providers 206A-206D.

In STEP 306, the marketplace system 200 can select among networks 204A-204B. In some embodiments, the marketplace system 200 can display an interface 202 with a selectable list of the one or more networks 204A-204B associated with the one or more token-holding data structure providers 206A-206D for the user of the client device 203 to select among. In some embodiments, the marketplace system 200 can identify a selection of a network in the list of the one or more networks 204A-204B.

In some embodiments, in response to identifying the selection of the network, the marketplace system 200 can retrieve communication information for communicating with the selected network. For example, the marketplace system 200 can retrieve current gas prices from the network, e.g., via an application programming interface (API) or other data communication interface associated with the network.

In some embodiments, in response to identifying the selection of the network, the marketplace system can display an interface 202 with a list of the one or more token-holding data structure providers 206A-206D associated with the selected network. For example, the marketplace system 200 can display available wallet providers for the user to use to connect their wallets.

In STEP 308, the marketplace system 200 can select among the one or more token-holding data structure providers 206A-206D. In some embodiments, the marketplace system 200 can display an interface 202 with a selectable list of the one or more token-holding data structure providers 206A-206D associated with the selected network for the user to select among. In some embodiments, the marketplace system 200 may maintain a library or index of token-holding data structure providers 206A-206D associated with each network 204A-204B. The library/index may be manually curated and/or programmatically generated based on data discoverable on the network 204A-204B. For example, the marketplace system 200 can display a list of wallet providers (e.g., Metamask, Wallet Connect, Coinbase Wallet) for the user to select among. In some embodiments, the marketplace system 200 can identify a selection of one or more token-holding data structure providers 206A-206D in the list of the one or more token-holding data structure providers 206A-206D. For example, the marketplace system 200 can receive selections from the user about which wallet provider they would like to use.

In some embodiments, in response to identifying the selection of the one or more token-holding data structure providers 206A-206D, the marketplace system 200 can retrieve communication or authentication information for communicating with the selected one or more token-holding data structure providers 206A-206D. In some embodiments, in response to identifying the selection of the one or more token-holding data structure providers 206A-206D, the marketplace system 200 can display an interface 202 with a list of one or more token-holding data structures 208A-208H associated with the selected one or more token-holding data structure providers.

In STEP 310, the marketplace system 200 can select which one of the one or more token-holding data structures 208A-208H to link. In some embodiments, the marketplace system 200 can display an interface 202 with a selectable list of the selected one or more token-holding data structures 208A-208H for the user of the client device 203 to select among. In some embodiments, the marketplace system 200 can identify a selection of one or more token-holding data structures 208A-208H in the list of one or more token-holding data structures 208A-208H.

In some embodiments, the marketplace system 200 can communicate to or connect with the one or more token-holding data structures 208A-208H. In some embodiments, in response to identifying the selection of the one or more token-holding data structure 208A-208H, the marketplace system 200 can communicate to or connect with the one or more token-holding data structures 208A-208H. In some embodiments, in response to identifying the selection of the one or more token-holding data structure 208A-208H, the marketplace system 200 can retrieve communication or authentication information for accessing the selected one or more token-holding data structures 208A-208H. In some embodiments, the marketplace system 200 can use the communication or authentication information to communicate to or connect with the one or more token-holding data structures 208A-208H.

After connecting to the one or more token-holding data structures 208A-208H, the marketplace system 200 can retrieve information about the one or more token-holding data structures 208A-208H or the one or more digital tokens 210A-210P stored therein. The marketplace system 200 can retrieve information that is publicly available on the network 204A-204B. For example, after connecting to a wallet, the marketplace system 200 can retrieve information such as a wallet address, current balance, asset holdings (NFTs or otherwise), and transaction history of that wallet. The marketplace system 200 can retrieve this information without proving that the user is the owner of the wallet because the information is publicly available on the blockchain network. In some embodiments, the information includes a domain name of the user.

In some embodiments, the marketplace system 200 can display an interface 202 with information about the one or more token-holding data structures 208A-208H or the one or more digital tokens 210A-210P stored therein. For example, the interface 202 can include a wallet address, current balance, asset holdings (NFTs or otherwise), and transaction history of that wallet. In another example, the interface 202 can include the user's ENS name (domain name) to help the user verify the wallet they want to link. In some embodiments, the marketplace system 200 can display the interface 202 with a request to verify the selection of the one or more token-holding data structures 208A-208H. For example, the marketplace system 200 can display the interface 202 with a request for the user to verify the wallet they want to link.

In STEP 312, the marketplace system 200 can verify that the user owns the one or more token-holding data structures 208A-208H. For example, after a user has connected their wallet to the marketplace system 200, the user should prove ownership of the wallet. If the marketplace system 200 only has the wallet address of the wallet, then the marketplace system 200 cannot definitely prove ownership of the wallet. For example, the user could have "spoofed" the wallet.

In some embodiments, the marketplace system 200 can display an interface 202 with a request for the user to verify a relationship to (e.g., ownership of) the one or more token-holding data structures 208A-208H. In some embodiments, the marketplace system 200 can request authentication information to validate or verify the relationship to the one or more token-holding data structures 208A-208H. For example, the authentication information can be a message. In some embodiments, the marketplace system 200 can request authentication information from the one or more token-holding data structures providers 206A-206D or the one or more token-holding data structures 208A-208H such as one or more attributes and/or authentication parameters associated with the one or more token-holding data structures 208A-208H. In some embodiments, the marketplace system 200 can request a cryptographically signed message from the one or more token-holding data structures providers 206A-206D and the one or more token-holding data structures 208A-208H carrying, for example, the one or more attributes and/or authentication parameters associated with the one or more token-holding data structures 208A-208H. For example, to prove ownership of the wallet, the marketplace system 200 can prompt the user to cryptographically sign the message using the wallet provider and wallet they had connected to in the previous step.

The user can cause the token-holding data structures providers 206A-206D to sign the message using the wallet's private key and hash the message. In some embodiments, the marketplace system 200 can cause the one or more token-holding data structures providers 206A-206D to sign the message based on an identifier of the one or more token-holding data structures 208A-208H. In some embodiments, the marketplace system 200 can cause the one or more token-holding data structures providers 206A-206D to hash the message.

In some embodiments, the marketplace system 200 can receive the authentication information for verifying the relationship to the one or more token-holding data structures 208A-208H. In some embodiments, the marketplace system 200 can receive the authentication information from the one or more token-holding data structures providers 206A-206D. In some embodiments, the authentication information can be a cryptographically signed message from the one or more token-holding data structures providers 206A-206D or the one or more token-holding data structures 208A-208H selected by the user and connected to by the marketplace system 200.

The marketplace system 200 can analyze the authentication information. In some embodiments, the marketplace system 200 can identify that the authentication information is signed using the one or more token-holding data structures 208A-208H. For example, the marketplace system 200 can identify that the message is signed using the wallet's private key and hashed. In some embodiments, the marketplace system 200 can decrypt the authentication information to extract decrypted authentication information. For example, the marketplace system 200 can decrypt the message to identify that the message is signed using the wallet's private key and hashed. In some embodiments, the marketplace system 200 can decrypt the authentication information to identify that the authentication information includes a password or key. For example, the marketplace system 200 can identify that the message includes an address of the wallet.

By decrypting the authentication information, the marketplace system 200 can generate a comparison between the decrypted authentication information and the information about the one or more token-holding data structures 208A-208H. If the marketplace system 200 identifies or confirms a match between the decrypted authentication information and the information, then the marketplace system 200 can verifying the user's relationship to the one or more token-holding data structures 208A-208H. For example, if the marketplace system 200 decrypts the message, then the marketplace system 200 can identify the user's wallet address and confirm that it matches, which means that the user is indeed the owner of the wallet.

In STEP 314, the marketplace system 200 can link the one or more token-holding data structures 208A-208H for access upon subsequent logins to the account 201. In some embodiments, the link may include persistent access rights of the account 201 to the one or more token-holding data structures 208A-208H based on the verification of the user's relationship to the one or more token-holding data structures 208A-208H detailed above. Accordingly, the account 201 may provide access to the one or more token-holding data structures 208A-208H upon a subsequent login to the account 201 without a need to authenticate with the one or more token-holding data structures 208A-208H itself. For example, after confirming that the user is the owner of the wallet, the marketplace system 200 can associate the wallet address with the user's login info (e.g., email address) in a database of the marketplace system 200. In some embodiments, the marketplace system 200 can associate the one or more token-holding data structures 208A-208H with the account 201. For example, the wallet address can be associated with the user unless the user requests to un-link their wallet. When the user uses the marketplace system 200 in the future, as long as the user logs into their account, they will prove ownership of this wallet without having to re-verify. In some embodiments, the marketplace system 200 can link the one or more token-holding data structures 208A-208H to the marketplace system 200. In some embodiments, in response to verifying the relationship to the one or more token-holding data structures 208A-208H, the marketplace system 200 can link the one or more token-holding data structures 208A-208H. In some embodiments, the marketplace system 200 can display an interface 202 with a confirmation of linking the one or more token-holding data structures 208A-208H. For example, the marketplace system 200 can establish ownership of the one or more token-holding data structures 208A-208H and there is no need for further verification.

In STEP 316, the marketplace system 200 can display the one or more token-holding data structures 208A-208H in the interface 202. For example, after verifying that the user is the owner of the wallet, the marketplace system 200 can display their assets, such as NFTs, on their public profile. In some embodiments, the marketplace system 200 can transmit a request to the one or more token-holding data structure providers 206A-206D for information about the one or more token-holding data structures 208A-208H. In some embodiments, the marketplace system 200 can receive information about the one or more token-holding data structures 208A-208H. In some embodiments, the marketplace system 200 can receive the information in response to the request. For example, the marketplace system 200 can receive information about a wallet address, current balance, asset holdings (NFTs or otherwise), and transaction history of that wallet. In some embodiments, the marketplace system 200 can store the information about the token-holding data structure. In some embodiments, the marketplace system 200 can display an interface 202 with information about the one or more token-holding data structures 208A-208H and the one or more digital tokens 210A-210P stored therein.

In some embodiments, the marketplace system can execute STEPS 304-314 to link additional one or more token-holding data structures 208A-208H to display an interface 202 with additional token-holding data structures in the interface 202 for the account 201.

In STEP 318, the marketplace system 200 can display the one or more digital tokens 210A-210P in the interface 202. For example, the user can use the assets in their wallet for display such as a personal gallery or post messages using it. In some embodiments, the interface 202 includes a selectable option (e.g., "NFTs tab") for displaying the one or more digital tokens 210A-210P. In some embodiments, the marketplace system 200 can display an interface 202 with a selectable option to view the one or more digital tokens 210A-210P maintained by all the linked token-holding data structures 208A-208H. In some embodiments, the marketplace system 200 can display an interface 202 with selectable options to view a subset of the one or more digital tokens 210A-210P maintained by all the linked token-holding data structures. In some embodiments, the marketplace system 200 can display an interface 202 with selectable options to view a subset of the one or more digital tokens 210A-210P maintained by a subset of the linked token-holding data structures. In some embodiments, the marketplace system 200 can display an interface 202 with selectable options to view all the one or more digital tokens 210A-210P of a subset of the one or more token-holding data structures 208A-208H that are linked to the marketplace system 200.

In response to identifying the selections, the marketplace system 200 can display an interface 202 with the selected one or more digital tokens 210A-210P from the one or more token-holding data structures 208A-208H. In some embodiments, the marketplace system 200 can transmit a request to the token-holding data structures providers 206A-206D of the selected token-holding data structures 208A-208H to identify the one or more digital tokens 210A-210P stored therein. In some embodiments, the marketplace system 200 can receive, in response to the request, identification of the one or more digital tokens 210A-210P stored in the token-holding data structures 208A-208H of the token-holding data structures providers 206A-206D.

Figure 4:
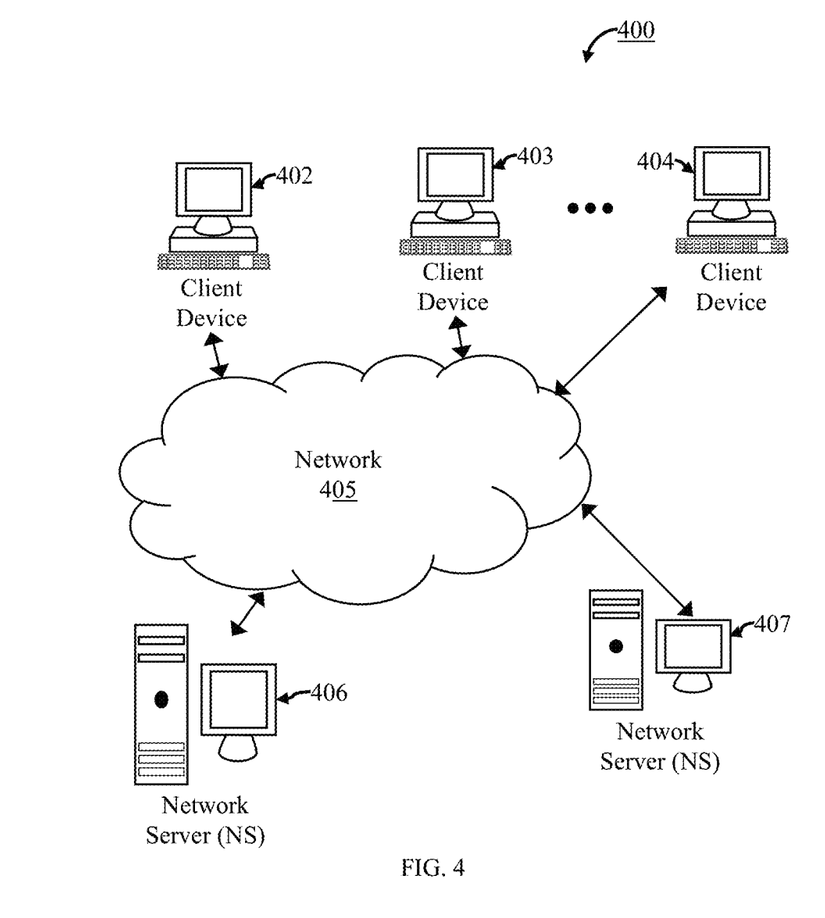

FIG. 4 depicts a block diagram of a computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of clients and concurrent transactions, as detailed herein. In some embodiments, the exemplary computer-based system and platform 400 may be based on a scalable computer and network architecture that incorporates various strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), AR glasses/lens, and/or any other device that is equipped to communicate over a wired and/or wireless communication medium (e.g., NFC, RFID, NBIOT, 3G, 4G, 5G, GSM, GPRS, Wi-Fi, WiMAX, CDMA, satellite, Bluetooth, ZigBee, etc.).

In some embodiments, one or more member devices within member devices 402-404 may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as Hypertext Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, Python .Net, QT, C, C++ and/or other suitable programming language. In some embodiments, one or more member devices within member devices 402-404 may be specifically programmed to include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based, at least in part, on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as, but not limited to: NFC, RFID, Narrow Band Internet of Things (NBIOT), ZigBee, 3G, 4G, 5G, GSM, GPRS, Wi-Fi, WiMAX, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in a non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 801-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

In some embodiments, the present disclosure includes a method that includes displaying, by a processor, in an interface accessible to a user via a login, one or more first digital tokens maintained in a first token-holding data structure of a first token-holding data structure provider of a first network. The method can include receiving, by the processor, from the user, a selection of a second network of at least one network associated with a second token-holding data structure provider. The method can include receiving, by the processor, from the user, a selection of a second token-holding data structure provider of at least one token-holding data structure provider associated with the second network. The method can include receiving, by the processor, from the user, a selection of a second token-holding data structure of at least one token-holding data structure associated with the second token-holding data structure provider. The method can include establishing, by the processor, a link to the second token-holding data structure controlling to receiving a verification of relationship of the second token-holding data structure. The method can include receiving, by the processor, via the link, information about one or more second digital tokens maintained in the second token-holding data structure. The method can include displaying, by the processor, in the interface, the one or more first digital tokens maintained in the first token-holding data structure and the one or more second digital tokens maintained in the second token-holding data structure.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments. Embodiment examples are described as follows with reference to the figures. Identical, similar, or identically acting elements in the various figures are identified with identical reference numbers and a repeated description of these elements is omitted in part to avoid redundancies.

From the foregoing description, it will be apparent that variations and modifications may be made to the embodiments of the present disclosure to adopt it to various usages and conditions. Such embodiments are also within the scope of the following claims.

The recitation of a listing of elements in any definition of a variable herein includes definitions of that variable as any single element or combination (or sub-combination) of listed elements. The recitation of an embodiment herein includes that embodiment as any single embodiment or in combination with any other embodiments or portions thereof.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "component," "module," "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetB SD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method comprising: displaying, by at least one processor, in an interface accessible to a user via a login, one or more first digital tokens maintained in a first token-holding data structure of a first token-holding data structure provider of a first blockchain network; receiving, by the at least one processor, from the user, a selection of a second token-holding data structure provider of a plurality of token-holding data structure providers; receiving, by the at least one processor, from the user, a selection of a second token-holding data structure associated with the second token-holding data structure provider; receiving, by the processor, from the user, at least one authentication message for authenticating the user as owner of the second token-holding data structure, the at least one authentication message comprising encrypted information; decrypting, by the processor, the encrypted information of the at least one authentication message to extract information for authentication of the user; establishing, by the at least one processor, a link to the second token-holding data structure a verification of the user as owner of the second token-holding data structure based at least in part on the information matching at least one attribute of the second token-holding data structure; receiving, by the at least one processor, via the link, information about one or more second digital tokens maintained in the second token-holding data structure; and displaying, by the at least one processor, in the interface, the one or more first digital tokens maintained in the first token-holding data structure and the one or more second digital tokens maintained in the second token-holding data structure.

Clause 2. The method of clause 1, further comprising: receiving, by the at least one processor, from the user, a subsequent login attempt to access the interface; validating, by the at least one processor, the subsequent login attempt to enable the user to access the interface; and accessing, by the at least one processor, a first current state of the one or more digital tokens maintained in the first token-holding data structure and, via the link, a second current state of the one or more second digital tokens maintained in the second token-holding data structure; and displaying, by the processor, in the interface, the first current state of the one or more digital tokens maintained in the first token-holding data structure and the second current state of the one or more second digital tokens maintained in the second token-holding data structure.

Clause 3. The method of clause 1, wherein the second token-holding data structure is associated with a second blockchain network that is different from the first blockchain network.

Clause 4. The method of clause 1, wherein the second token-holding data structure is associated with the first blockchain network.

Clause 5. The method of clause 1, wherein the first token-holding data structure provider and the second token-holding data structure provider are different token-holding structure providers of the plurality of token-holding data structure providers.

Clause 6. The method of clause 1, wherein the information comprises an address of the second token-holding data structure.

Clause 7. The method of clause 1, further comprising: requesting, by the processor, from the second token-holding data structure provider, authentication information for access to the second token-holding data structure; receiving, by the processor, from the second token-holding data structure provider, the authentication information comprising the at least one attribute of the second token-holding data structure; authenticating, by the processor, the user as the owner of the second token-holding data structure based on the authentication information matching the information for authentication of the user; and establishing, by the processor, a link to the second token-holding data structure based on the authenticating.

Clause 8. The method of clause 1, wherein the link comprises a persistent authentication with the second token-holding data structure to enable access to the second token-holding data structure without another authentication message.

Clause 9. The method of clause 1, wherein the first token-holding data structure comprises a first blockchain wallet.

Clause 10. The method of clause 1, further comprising: generating, by the processor, at least one interface element of the interface representing an aggregate of the one or more first digital tokens and the one or more second digital tokens.

Clause 11. A system comprising: at least one processor that, upon execution of software instructions, is configured to: display in an interface accessible to a user via a login, one or more first digital tokens maintained in a first token-holding data structure of a first token-holding data structure provider of a first blockchain network; receive from the user, a selection of a second token-holding data structure provider of a plurality of token-holding data structure providers; receive from the user, a selection of a second token-holding data structure associated with the second token-holding data structure provider; receive from the user, at least one authentication message for authenticating the user as owner of the second token-holding data structure, the at least one authentication message comprising encrypted information; decrypt the encrypted information of the at least one authentication message to extract information for authentication of the user; establish a link to the second token-holding data structure a verification of the user as owner of the second token-holding data structure based at least in part on the information matching at least one attribute of the second token-holding data structure; receive via the link, information about one or more second digital tokens maintained in the second token-holding data structure; and display in the interface, the one or more first digital tokens maintained in the first token-holding data structure and the one or more second digital tokens maintained in the second token-holding data structure.

Clause 12. The system of clause 11, wherein the processor is further configured to: receive, from the user, a subsequent login attempt to access the interface; validate the subsequent login attempt to enable the user to access the interface; and access a first current state of the one or more digital tokens maintained in the first token-holding data structure and, via the link, a second current state of the one or more second digital tokens maintained in the second token-holding data structure; and display, in the interface, the first current state of the one or more digital tokens maintained in the first token-holding data structure and the second current state of the one or more second digital tokens maintained in the second token-holding data structure.

Clause 13. The system of clause 11, wherein the second token-holding data structure is associated with a second blockchain network that is different from the first blockchain network.

Clause 14. The system of clause 11, wherein the second token-holding data structure is associated with the first blockchain network.

Clause 15. The system of clause 11, wherein the first token-holding data structure provider and the second token-holding data structure provider are different token-holding structure providers of the plurality of token-holding data structure providers.

Clause 16. The system of clause 11, wherein the information comprises an address of the second token-holding data structure.

Clause 17. The system of clause 11, wherein the processor is further configured to: request, from the second token-holding data structure provider, authentication information for access to the second token-holding data structure; receive, from the second token-holding data structure provider, the authentication information comprising the at least one attribute of the second token-holding data structure; authenticate the user as the owner of the second token-holding data structure based on the authentication information matching the information for authentication of the user; and establish a link to the second token-holding data structure based on the authenticating.

Clause 18. The system of clause 11, wherein the link comprises a persistent authentication with the second token-holding data structure to enable access to the second token-holding data structure without another authentication message.

Clause 19. The system of clause 11, wherein the first token-holding data structure comprises a first blockchain wallet.

Clause 20. The system of clause 11, wherein the processor is further configured to: generate at least one interface element of the interface representing an aggregate of the one or more first digital tokens and the one or more second digital tokens.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
  displaying, by at least one processor, in an interface accessible to a user via a login to a user account, one or more first digital tokens maintained in a first token-holding data structure of a first token-holding data structure provider of a first blockchain network;
  receiving, by the at least one processor, from the user, a selection of a second token-holding data structure provider of a plurality of token-holding data structure providers;
  receiving, by the at least one processor, from the user, a selection of a second token-holding data structure associated with the second token-holding data structure provider;
  receiving, by the processor, from the user, at least one authentication message for authenticating the user as owner of the second token-holding data structure, the at least one authentication message comprising encrypted information associated with a private key associated with the second token-holding data structure;
  decrypting, by the processor, the encrypted information of the at least one authentication message to extract information for authentication of the user;
  establishing, by the at least one processor, using the private key, persistent access rights of the user account to access the second token-holding data structure so as to establish a link to the second token-holding data structure upon a verification of the user as owner of the second token-holding data structure based at least in part on the information matching at least one attribute of the second token-holding data structure;
    wherein the persistent access rights enable access, via the user account, to the second token-holding data structure without verification by the user with the second token-holding data structure provider;
  receiving, by the at least one processor, via the link, information about one or more second digital tokens maintained in the second token-holding data structure; and
  displaying, by the at least one processor, in the interface, the one or more first digital tokens maintained in the first token-holding data structure and the one or more second digital tokens maintained in the second token-holding data structure.

2. The method of claim 1, further comprising:
receiving, by the at least one processor, from the user, a subsequent login attempt to access the interface;
validating, by the at least one processor, the subsequent login attempt to enable the user to access the interface;
accessing, by the at least one processor, a first current state of the one or more digital tokens maintained in the first token-holding data structure and, via the link, a second current state of the one or more second digital tokens maintained in the second token-holding data structure; and
displaying, by the processor, in the interface, the first current state of the one or more digital tokens maintained in the first token-holding data structure and the second current state of the one or more second digital tokens maintained in the second token-holding data structure.

3. The method of claim 1, wherein the second token-holding data structure is associated with a second blockchain network that is different from the first blockchain network.

4. The method of claim 1, wherein the second token-holding data structure is associated with a second blockchain network.

5. The method of claim 1, wherein the first token-holding data structure provider and the second token-holding data structure provider are different token-holding structure providers of the plurality of token-holding data structure providers.

6. The method of claim 1, wherein the information comprises an address of the second token-holding data structure.

7. The method of claim 1, further comprising:
requesting, by the processor, from the second token-holding data structure provider, authentication information for access to the second token-holding data structure;
receiving, by the processor, from the second token-holding data structure provider, the authentication information comprising the at least one attribute of the second token-holding data structure;
authenticating, by the processor, the user as the owner of the second token-holding data structure based on the authentication information matching the information for authentication of the user; and
establishing, by the processor, a link to the second token-holding data structure based on the authenticating.

8. The method of claim 1, wherein the link comprises a persistent authentication with the second token-holding data structure to enable access to the second token-holding data structure without another authentication message.

9. The method of claim 1, wherein the first token-holding data structure comprises a first blockchain wallet.

10. The method of claim 1, further comprising:
generating, by the processor, at least one interface element of the interface representing an aggregate of the one or more first digital tokens and the one or more second digital tokens.

11. A system comprising:
at least one hardware processor, wherein the at least one hardware processor, upon execution of software instructions, is configured to:
display in an interface accessible to a user via a login to a user account, one or more first digital tokens maintained in a first token-holding data structure of a first token-holding data structure provider of a first blockchain network;
receive from the user, a selection of a second token-holding data structure provider of a plurality of token-holding data structure providers;
receive from the user, a selection of a second token-holding data structure associated with the second token-holding data structure provider;
receive from the user, at least one authentication message for authenticating the user as owner of the second token-holding data structure, the at least one authentication message comprising encrypted information associated with a private key associated with the second token-holding data structur;
decrypt the encrypted information of the at least one authentication message to extract information for authentication of the user;
establish using the private key, persistent access rights of the user account to access the second token-holding data structure so as to establish a link to the second token-holding data structure upon a verification of the user as owner of the second token-holding data structure based at least in part on the information matching at least one attribute of the second token- holding data structure;
wherein the persistent access rights enable access, via the user account, to the second token-holding data structure without verification by the user with the second token-holding data structure provider;
receive via the link, information about one or more second digital tokens maintained in the second token-holding data structure; and
display in the interface, the one or more first digital tokens maintained in the first token-holding data structure and the one or more second digital tokens maintained in the second token-holding data structure.

12. The system of claim 11, wherein the hardware processor is further configured to:
receive, from the user, a subsequent login attempt to access the interface;
validate the subsequent login attempt to enable the user to access the interface; and
access a first current state of the one or more digital tokens maintained in the first token-holding data structure and, via the link, a second current state of the one or more second digital tokens maintained in the second token-holding data structure; and
display, in the interface, the first current state of the one or more digital tokens maintained in the first token-holding data structure and the second current state of the one or more second digital tokens maintained in the second token-holding data structure.

13. The system of claim 11, wherein the second token-holding data structure is associated with a second blockchain network that is different from the first blockchain network.

14. The system of claim 11, wherein the second token-holding data structure is associated with the first blockchain network.

15. The system of claim 11, wherein the first token-holding data structure provider and the second token-holding data structure provider are different token-holding structure providers of the plurality of token-holding data structure providers.

16. The system of claim 11, wherein the information comprises an address of the second token-holding data structure.

17. The system of claim 11, wherein the hardware processor is further configured to:

request, from the second token-holding data structure provider, authentication information for access to the second token-holding data structure;

receive, from the second token-holding data structure provider, the authentication information comprising the at least one attribute of the second token-holding data structure;

authenticate the user as the owner of the second token-holding data structure based on the authentication information matching the information for authentication of the user; and establish a link to the second token-holding data structure based on the authenticating.

18. The system of claim 11, wherein the link comprises a persistent authentication with the second token-holding data structure to enable access to the second token-holding data structure without another authentication message.

19. The system of claim 11, wherein the first token-holding data structure comprises a first blockchain wallet.

20. The system of claim 11, wherein the hardware processor is further configured to:

generate at least one interface element of the interface representing an aggregate of the one or more first digital tokens and the one or more second digital tokens.

* * * * *